United States Patent
Li et al.

(10) Patent No.: US 9,130,381 B2
(45) Date of Patent: Sep. 8, 2015

(54) SYSTEMS AND METHODS FOR IDENTIFYING AND MONITORING A BATTERY CHARGER

(71) Applicant: O2Micro Inc., Santa Clara, CA (US)

(72) Inventors: Guoxing Li, Sunnyvale, CA (US); Xiaofei Gong, Shanghai (CN)

(73) Assignee: O2MICRO INC., Santa Clara, CA (US)

( * ) Notice: Subject to any disclaimer, the term of this patent is extended or adjusted under 35 U.S.C. 154(b) by 198 days.

(21) Appl. No.: 13/958,959

(22) Filed: Aug. 5, 2013

(65) Prior Publication Data
US 2015/0035475 A1    Feb. 5, 2015

(51) Int. Cl.
*H02J 7/00*    (2006.01)

(52) U.S. Cl.
CPC ............ *H02J 7/0029* (2013.01); *H02J 7/0004* (2013.01); *H02J 7/0036* (2013.01)

(58) Field of Classification Search
CPC ...................................................... H02J 7/0029
USPC .......................................................... 320/107
See application file for complete search history.

(56) References Cited

U.S. PATENT DOCUMENTS

| | | | | |
|---|---|---|---|---|
| 5,592,069 A * | 1/1997 | Dias et al. | | 320/106 |
| 5,633,573 A * | 5/1997 | van Phuoc et al. | | 320/128 |
| 5,729,115 A * | 3/1998 | Wakefield | | 320/110 |
| 6,025,695 A * | 2/2000 | Friel et al. | | 320/106 |
| 2012/0074893 A1 * | 3/2012 | Cole | | 320/101 |

* cited by examiner

*Primary Examiner* — Sun Lin
(74) *Attorney, Agent, or Firm* — Pillsbury Winthrop Shaw Pittman LLP

(57) ABSTRACT

A charger includes a first terminal, a second terminal and a third terminal. The first terminal and the second terminal are configured for providing an output power to a battery module. The charger also includes a signal generation unit configured for generating an identity signal which indicates an identity of the charger. The charger is configured for outputting the identity signal to the battery module via the third terminal.

33 Claims, 7 Drawing Sheets

SYSTEMS AND METHODS FOR IDENTIFYING AND MONITORING A BATTERY CHARGER

FIELD OF THE PRESENT TEACHING

The present teaching relates generally to battery charging circuits and in particular to systems and methods for identifying and monitoring a battery charger.

BACKGROUND

Batteries are commonly used as power supplies in electric devices, such as electric vehicles and various kinds of portable electric equipments. FIG. 1 is a block diagram illustrating a conventional battery charging circuit 100. The charging circuit 100 includes a charger 102 for charging a battery pack 104 which includes multiple battery cells 106. The charger 102 includes a positive terminal CH+ and a negative terminal CH− for providing power to charge the battery pack 104. The battery pack 104 includes a positive terminal BAT+ and a negative terminal BAT− for receiving power from the charger.

Due to a misuse of an inappropriate charger to charge a battery, the battery may be damaged. For example, if the charger 102 provides a 64V output voltage while the maximum allowable charging voltage of the battery pack 104 is 48V, the battery pack 104 may be damaged. On the other hand, if the charger 102 becomes over-heated during charging due to circuit failure or poor ventilation, the charger 102 may also be damaged. Therefore, there exists a need to provide an improved charging circuit that the user can be warned if an inappropriate charger is used to charge the battery or if the circuit becomes over-heated.

SUMMARY

The embodiments described herein relate to methods and systems for identifying and monitoring a charger.

In an embodiment, a charger is disclosed. The charger includes a first terminal and a second terminal configured for providing an output power to a battery module, a signal generation unit configured for generating an identity signal which indicates an identity of the charger, and a third terminal configured for outputting the identity signal to the battery module.

In another embodiment, a battery module is disclosed. The battery module includes a first terminal and a second terminal configured for receiving power from a charger, a third terminal configured for receiving an identity signal from the charger, and a battery management system configured for determining whether the charger is an appropriate charger for charging the battery module based on the identity signal.

In yet another embodiment, a method for identifying and monitoring a charger by a battery module is disclosed. The battery module receives output power from the charger via a first terminal and a second terminal of the battery module. The battery module receives an identity signal from the charger at a third terminal of the battery module. The battery module determines whether the charger is an appropriate charger based on the identity signal.

Additional benefits and novel features will be set forth in part in the description which follows, and in part will become apparent to those skilled in the art upon examination of the following and the accompanying drawings or may be learned by production or operation of the disclosed embodiments. The benefits of the present embodiments may be realized and attained by practice or use of various aspects of the methodologies, instrumentalities and combinations set forth in the detailed description set forth below.

BRIEF DESCRIPTION OF THE DRAWINGS

Features and benefits of embodiments of the claimed subject matter will become apparent as the following detailed description proceeds, and upon reference to the drawings, wherein like numerals depict like parts. These exemplary embodiments are described in detail with reference to the drawings. These embodiments are non-limiting exemplary embodiments, in which like reference numerals represent similar structures throughout the several views of the drawings.

DETAILED DESCRIPTION

Reference will now be made in detail to the embodiments of the present teaching. While the present teaching will be described in conjunction with these embodiments, it will be understood that they are not intended to limit the present teaching to these embodiments. On the contrary, the present teaching is intended to cover alternatives, modifications and equivalents, which may be included within the spirit and scope of the present teaching as defined by the appended claims.

Furthermore, in the following detailed description of the present teaching, numerous specific details are set forth in order to provide a thorough understanding of the present teaching. However, it will be recognized by one of ordinary skill in the art that the present teaching may be practiced without these specific details. In other instances, well known methods, procedures, components, and circuits have not been described in detail as not to unnecessarily obscure aspects of the present teaching.

Figure 1:
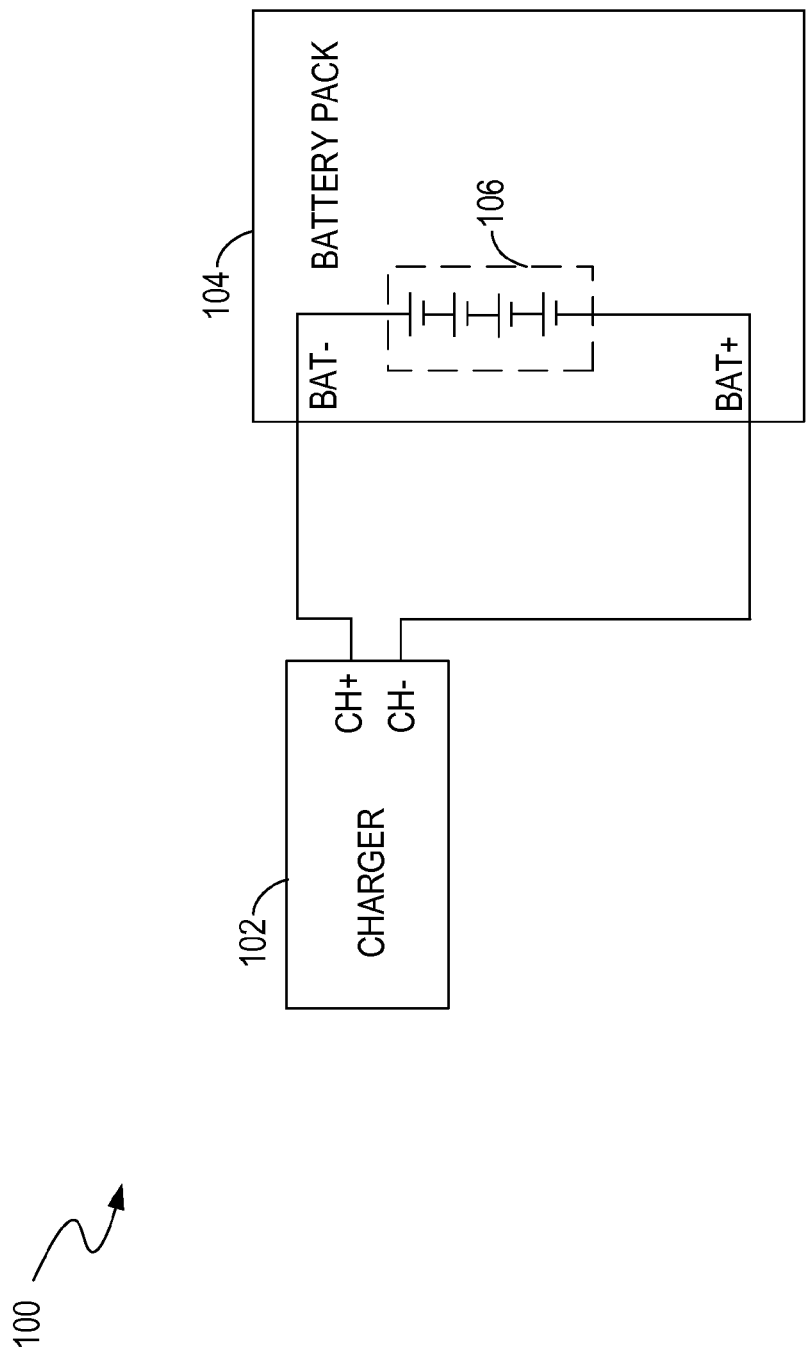
FIG. 1 (PRIOR ART) is a block diagram illustrating a conventional charging circuit.
Figure 2:
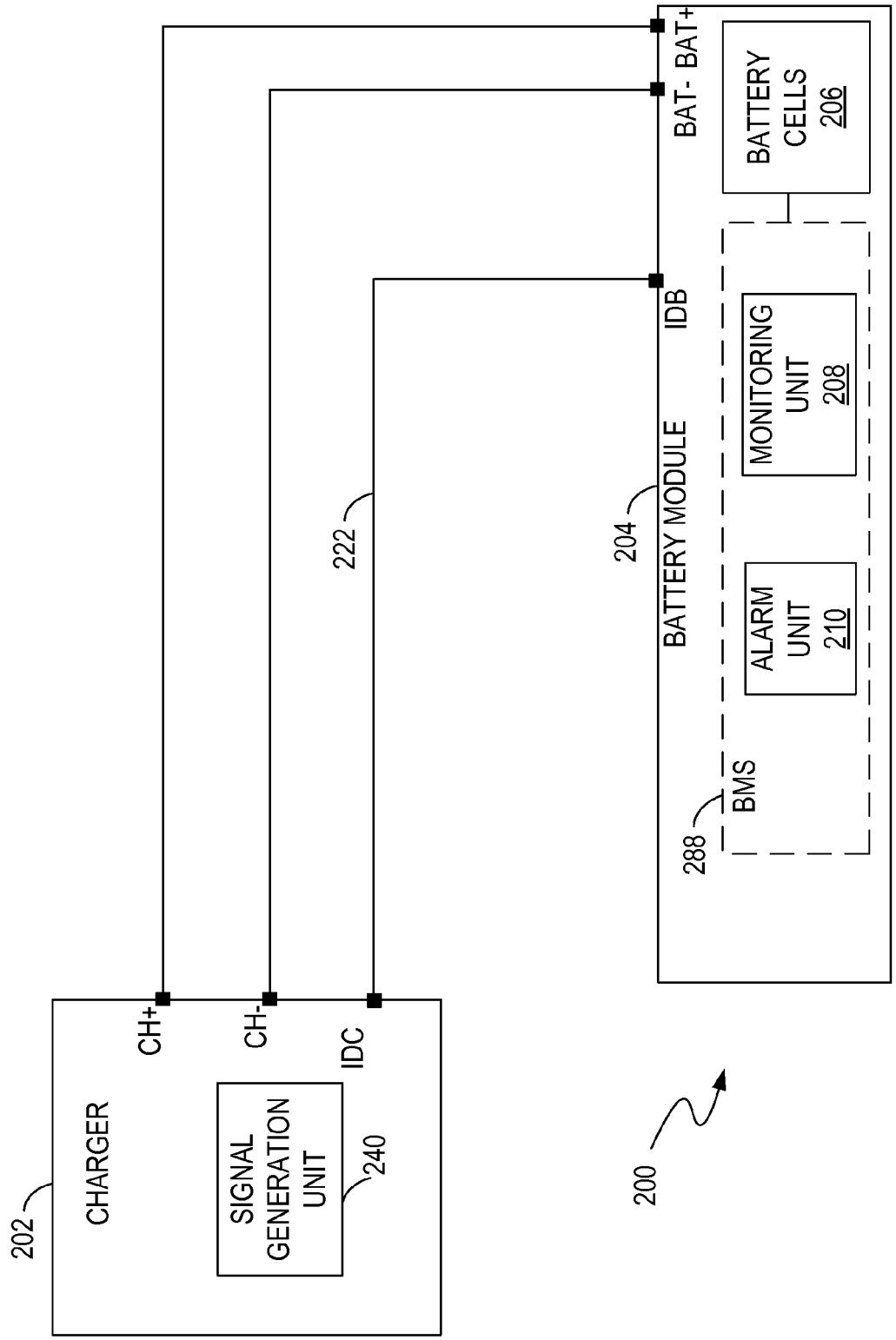
FIG. 2 is a block diagram illustrating a charging circuit, in accordance with an embodiment of the present teaching.

FIG. 2 is a block diagram illustrating a charging circuit 200, in accordance with an embodiment of the present teaching. The charging circuit 200 in this embodiment utilizes a charger 202 to charge a battery module 204.

The charger 202 may have three terminals including a first terminal CH+, a second terminal CH−, and a third terminal IDC. The battery module 204 may have three terminals including a first terminal BAT+, a second terminal BAT−, and a third terminal IDB. The charger 202 can provide an output power via the first and the second terminals CH+ and CH− to charge the battery module 204. The battery module 204 can receive power from the charger 202 via the first terminal BAT+ and the second terminal BAT−. The charger 202 may communicate with the battery module 204 via the terminal IDC and the terminal IDB. The charger 202 may include a signal generation unit 240 configured for generating an identity signal that indicates an identity of the charger 202. The identity of the charger 202 may indicate attributes of the charger 202 such as the rated input/output current and rated input/output voltage of the charger 202, the charging algorithm of the charger 202, etc. The charger 202 may output the identity signal to the battery module 204 via the third terminal IDC. The battery module 204 may receive the identity signal from the charger 202 via the third terminal IDB. A communication wire 222 may be coupled between the third terminal IDC of the charger 202 and the third terminal IDB of the battery module 204. The battery module 204 may include multiple battery cells 206 and a battery management system (BMS) 288. The BMS 288 can determine whether the charger 202 is an appropriate charger for charging the battery module 204 based on the identity signal. The BMS 288 may include a monitoring unit 208 and an alarm unit 210. The monitoring unit 208 may monitor status of the battery cells 206 including voltages, current and temperatures of the battery cells 206, and can determine if the status of the battery cells 206 is abnormal. The alarm unit 210 may output an alarm signal if the BMS 288 identifies or determines the charger 202 as an inappropriate charger, or if BMS 288 detects that the status of the battery cells 206 is abnormal.

Figure 3:
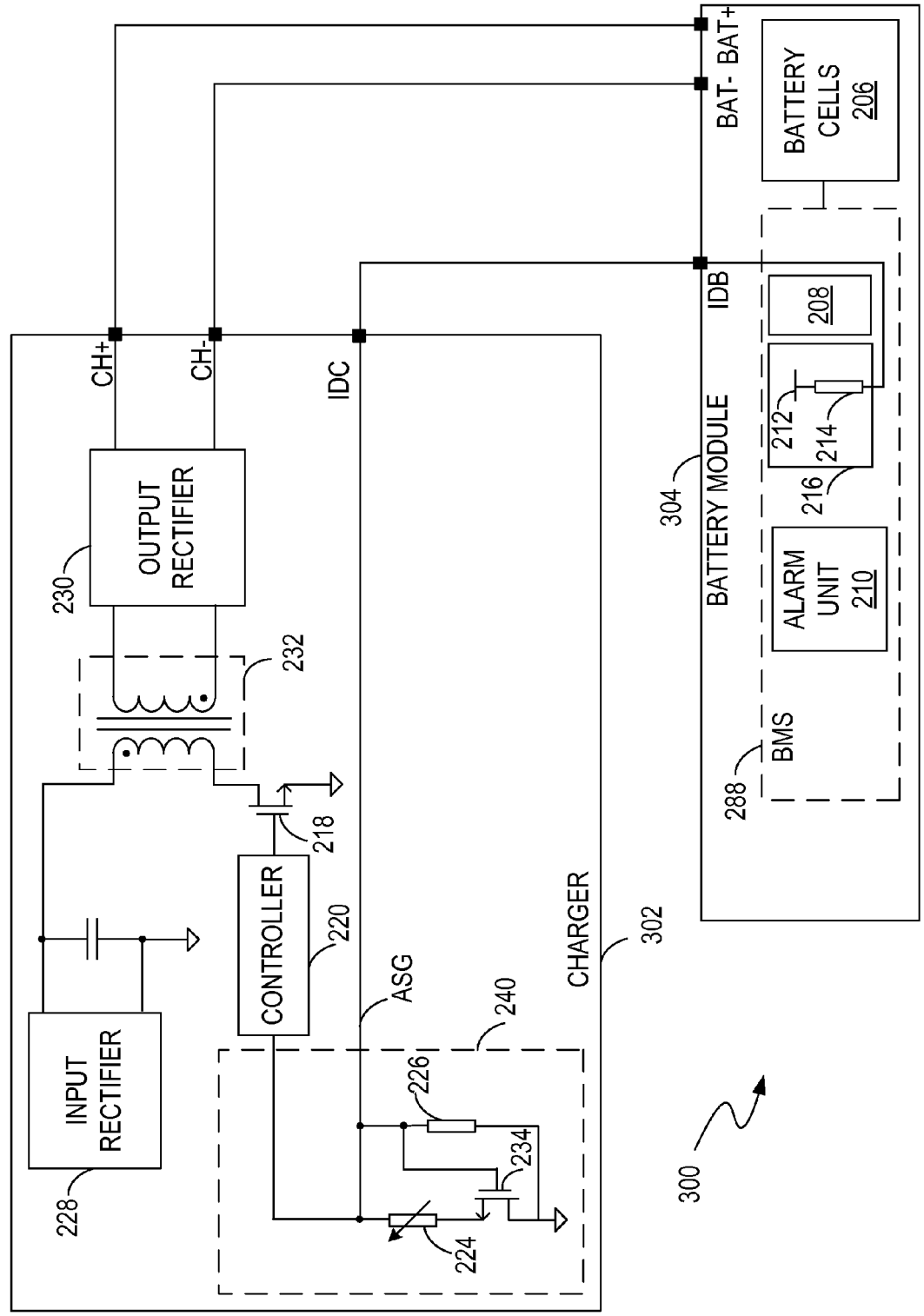
FIG. 3 is a block diagram illustrating another charging circuit, in accordance with an embodiment of the present teaching.

FIG. 3 is a block diagram illustrating another charging circuit 300, in accordance with an embodiment of the present teaching. Elements labeled the same as in FIG. 2 have similar functions. The charging circuit 300 in this embodiment utilizes a charger 302 to charge a battery module 304. The charger 302 may have three terminals including a first terminal CH+, a second terminal CH−, and a third terminal IDC. The battery module 304 may have three terminals including a first terminal BAT+, a second terminal BAT−, and a third terminal IDB. In the example of FIG. 3, the charger 302 may communicate with the battery module 304 via the terminal IDC, a communication wire 222 and the terminal IDB by analog signals.

In the charger 302, an input rectifier 228 may rectify an input AC voltage and provide a rectified voltage to a primary side of a transformer 232. An output rectifier 230 may be coupled to a secondary side of the transformer 232 and provide a DC voltage. The charger 302 may output the DC voltage via the first and the second terminals CH+ and CH− to the battery module 304. A controller 220 may control a switch 218 coupled to the transformer 232. The charger 302 may further include a signal generation unit 240 configured for generating an identity signal ASG that indicates an identity of the charger 302. The identity signal ASG may be an analog signal. The identity signal ASG can further indicate a temperature of the charger 302. The identity signal ASG may be output to the battery module 304 via the third terminal IDC of the charger 302. In the example of FIG. 3, the signal generation unit 240 may include a first resistor 226 and a thermistor 224. The first resistor 226 may be coupled between the third terminal IDC and ground. The thermistor 224 may be coupled in series with a switch 234. The thermistor 224 may be a semiconductor device made of materials whose resistance varies as a function of temperature in the charger 302. The thermistor 224 and the switch 234 can be coupled in parallel with the first resistor 226. A conductance status of the switch 234 may be determined by a voltage across the first resistor 226.

The battery module 304 may receive power from the charger 302 via the first terminal BAT+ and the second terminal BAT−, and receive the identity signal ASG from the charger 302 via the third terminal IDB. The battery module 304 may include multiple battery cells 206 and a battery management system (BMS) 288. The BMS 288 may identify or determine whether the charger 302 is an appropriate charger for charging the battery module 304 and detect a temperature of the charger 302 based on a voltage at the third terminal IDB. The BMS 288 may include a monitoring unit 208, a test unit 216, and an alarm unit 210. The monitoring unit 208 can monitor status of the battery cells 206 including voltages, current, and temperatures of the battery cells 206, and can determine if the status of the battery cells 206 is abnormal. In the example of FIG. 3, the test unit 216 includes a power source 212, and a resistor 214 coupled between the power source 212 and the third terminal IDB. The test unit 216 can provide a test signal to enable the charger 302 to generate the identity signal ASG. The alarm unit 210 may output an alarm signal if the BMS 288 identifies or determines the charger 302 as an inappropriate charger, or if the BMS 288 detects that the temperature of the charger 302 is beyond a predetermined range, or if BMS 288 detects that the status of the battery cells 206 is abnormal.

Figure 4:
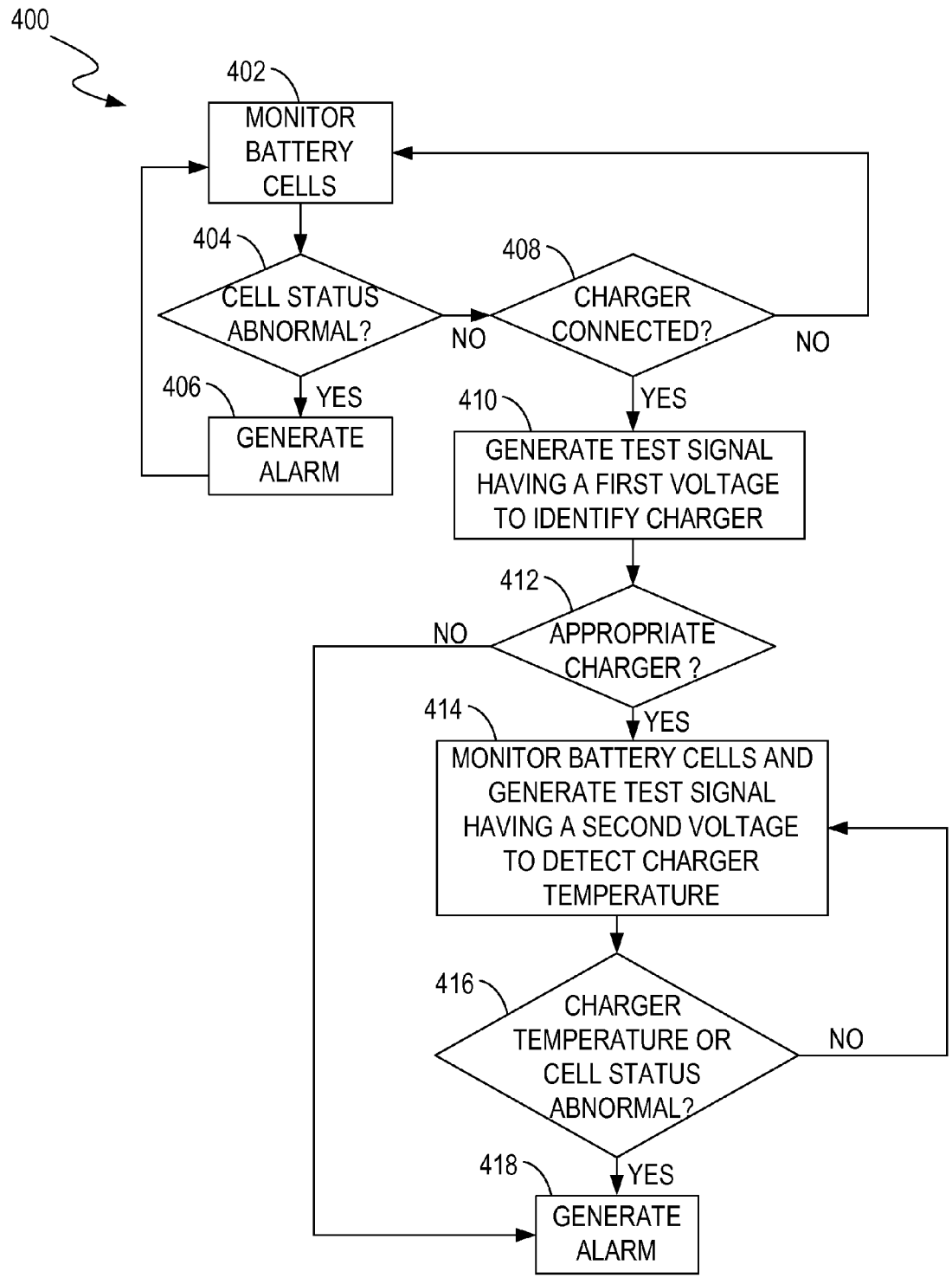
FIG. 4 is a flowchart illustrating a method for identifying and monitoring a charger, in accordance with an embodiment of the present teaching.

FIG. 4 is a flowchart 400 illustrating a method for identifying and monitoring a charger, in accordance with an embodiment of the present teaching. FIG. 4 may be described in combination with FIG. 3.

At 402, the BMS 288 in the battery module 304 may utilize the monitoring unit 208 to monitor status of the battery cells 206. At 404, the BMS 288 may determine whether the status of the battery cells 206 is abnormal. If the status of the battery cells 206 is abnormal, the flowchart 400 may proceed to 406. At 406, the alarm unit 210 may generate an alarm signal, which can be an audio signal or a visual signal, to warn the user. If the status of the battery cells is normal, the flowchart 400 may move to 408. At 408, the BMS 288 can detect if a charger (e.g., the charger 302) is connected to the battery module 304. If the charger 302 is not detected, the flowchart 400 may move back to 402, and the BMS 288 may continue monitoring the battery cells 206. If the charger 302 is detected, the flowchart 400 may proceed to 410 to identify whether the charger 302 is an appropriate charger for charging the battery module 304.

At 410, the test unit 216 can generate a test signal having a first voltage V1 to enable the charger 302 to generate the identity signal ASG which indicates an identity of the charger 302. The identity signal ASG may be an analog signal, and the voltage of the identity signal ASG can indicate whether the charger 302 is an appropriate charger for charging the battery module 304. More specifically, the power source 212 in the test unit 216 can apply a voltage signal (i.e., the test signal) having the first voltage V1 to the resistor 214. The first voltage V1 can be selected in such a way that if the charger 302 is coupled to the battery module 304, the voltage across the resistor 226 in the charger 302 is less than a turn-on threshold of the switch 234. As a result, a current can flow from the power source 212 to ground, through the resistor 214, the third terminal IDB of the battery module 304, the third terminal IDC of the charger 302, and the first resistor 226. The voltage V1 and the resistance of the resistor 214 can be known to the BMS 288. The voltage of the identity signal ASG therefore can depend on the resistance of the first resistor 226. The resistance of the first resistor 226 may be predetermined when the charger 302 is manufactured. In one embodiment, a specific resistance of the first resistor 226 is selected to indicate attributes of the charger 302. For example, a specific resistance of the first resistor 226 can be selected to indicate a rated output voltage of the charger 302. The third terminal IDB of the battery module 304 may be coupled to the third terminal IDC of the charger 302. As such, the voltage at the third terminal IDB of the battery module 304, i.e., the voltage of the identity signal ASG, may also depend on the resistance of the first resistor 226.

If the charger 302 is a compatible charger (i.e., an appropriate charger) for the battery module 304, the resistance of the first resistor 226 can have a value that is known or desired by the BMS 288. Furthermore, the voltage V1 and the resistance of the resistor 214 can also be known at the BMS 288. Therefore, the voltage at the third terminal IDB should be a desired voltage based on an applied V1 at the power source 212, if the charger 302 is an appropriate charger. The BMS 288 can monitor the voltage at the third terminal IDB. If the voltage at the third terminal IDB is within a predetermined range, the BMS 288 can identify the charger 302 as an appropriate charger, and the flowchart 400 may move to 414 to monitor battery cells 206 and to detect temperature of the charger 302 by the BMS 288. For example, if the desired voltage at the third terminal IDB is 48V, the predetermined range can be 47V to 49V. If the voltage at the third terminal IDB is beyond the predetermined range, the BMS 288 can identify the charger 302 as an inappropriate charger, and the flowchart 400 may move to 418 to generate an alarm signal by the alarm unit 210. In accordance with some embodiments, at 418, the BMS 288 may stop the battery module 304 from being charged by the charger 302, instead of or in addition to generating the alarm signal. In one example, the BMS 288 may turn off the first terminal BAT+ and the second terminal BAT− at the battery module 304. In another example, the BMS 288 may inform the charger 302 to stop charging the battery module 304, by sending a command signal.

At 414, the test unit 216 may generate the test signal having a second voltage V2 which is greater than the first voltage V1 to enable the charger 302 to generate the identity signal ASG which indicates a temperature of the charger 302. More specifically, the power source 212 in the test unit 216 can apply a voltage signal (i.e., the test signal) having the second voltage V2 to the resistor 214. The second voltage V2 can be selected in such a way that if the charger 302 is coupled to the battery module 304, the voltage across the resistor 226 in the charger 302 is greater than a turn-on threshold of the switch 234 such that the switch 234 can be turned on, and therefore the thermistor 224 can be coupled in parallel with the first resister 226. As a result, the voltage of the identity signal ASG may be determined by a total resistance of the first resistor 226 and the thermistor 224. The thermistor 224 can sense the temperature of the charger 302. The resistance of the thermistor 224 can vary with the temperature. Because the charger 302 is an appropriate charger, the resistance of the first resistor 226 and the temperature-resistance relation of the thermistor 224 can be known. Furthermore, the resistance of the resistor 214 and the voltage V2 can be predetermined. The voltage of the identity signal ASG may vary with the resistance of the thermistor 224 which may be determined by the temperature of the charger 302. In one embodiment, if the temperature of the charger 302 increases, the resistance of the thermistor 224 increases and the voltage of the identity signal ASG increases. In another embodiment, if the temperature of the charger 302 increases, the resistance of the thermistor 224 decreases and the voltage of the identity signal ASG decreases. Therefore, the charger 302 can be configured for adjusting the voltage of the identity signal ASG in response to the temperature of the charger 302 sensed by the thermistor 224. The BMS 288 can determine the resistance of the thermistor 224 based on the voltage at the third terminal IDB. In one embodiment, the BMS 288 may include a lookup table (not shown in FIG. 3) which stores resistance values of thermistor 224 and corresponding temperature values. As a result, the BMS 288 can detect the temperature of the charger 302 by the lookup table. On the other hand, the controller 220 in the charger 302 can also detect temperature of the charger 302 in a similar way as the BMS 288 does based on the voltage of the identity signal ASG and a known relation between the temperature values and the resistance values of the thermistor 224. If the controller 220 detects that the temperature of the charger 302 is beyond a predetermined range, the controller 220 can prevent the charger 302 from charging the battery module 304, e.g., by turning off the switch 218 coupled to the transformer 232.

At 416, the BMS 288 can determine whether the temperature of the charger 302 is beyond a predetermined range or the status of the battery cells 206 is abnormal. If yes, the flowchart 400 can move to 418 to generate an alarm signal. If not, the flowchart 400 may move back to 414 to continue monitoring battery cells 206 and detecting charger temperature.

Figure 5:
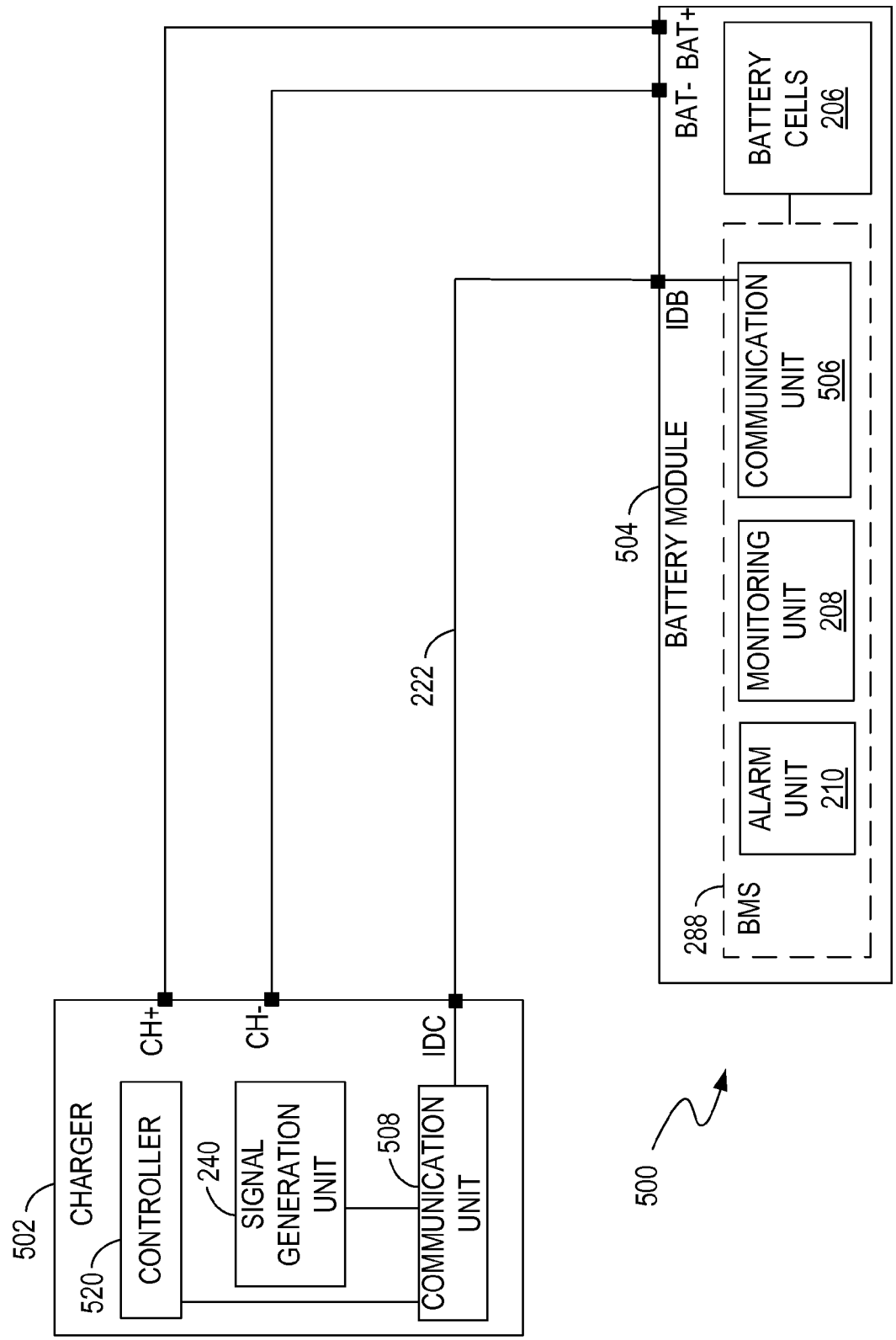
FIG. 5 is a block diagram illustrating yet another charging circuit, in accordance with an embodiment of the present teaching.

FIG. 5 is a block diagram illustrating yet another charging circuit 500, in accordance with an embodiment of the present teaching. Elements labeled the same as in FIG. 2 have similar functions. The charging circuit 500 in this embodiment utilizes a charger 502 to charge a battery module 504. The charger 502 may have three terminals including a first terminal CH+, a second terminal CH−, and a third terminal IDC. The battery module 504 may have three terminals including a first terminal BAT+, a second terminal BAT−, and a third terminal IDB. In the example of FIG. 5, the charger 502 communicates with the battery module 504 via the terminal IDC, a communication wire 222 and the terminal IDB by digital signals.

In the example of FIG. 5, the charger 502 includes a signal generation unit 240, a communication unit 508 and a controller 520. The signal generation unit 240 may be configured for generating an identity signal that indicates the identity of the charger 502. In the example of FIG. 5, the identity signal is a digital signal. The communication unit 508 may be coupled to the third terminal IDC and may be configured for communicating with the battery module 504. For example, the communication unit 508 may be configured for transmitting the identity signal to the battery module 504 and receiving commands from the battery module 504. The controller 520 may be coupled to the communication unit 508 and may be configured for controlling the output power of the charger 502 based on the commands. The battery module 504 may include multiple battery cells 206 and a BMS 288. The BMS 288 can identify or determine whether the charger 202 is an appropriate charger for charging the battery module 504 based on the identity signal. The BMS 288 may include a monitoring unit 208, an alarm unit 210 and a communication unit 506. The monitoring unit 208 can monitor status of the battery cells 206 including voltages, charging current and temperatures of the battery cells 206, and can determine if the status of the battery cells 206 is abnormal. The alarm unit 210 can output an alarm signal if the BMS 288 identifies the charger 502 as an inappropriate charger, or if BMS 288 detects that the status of the battery cells 206 is abnormal. The communication unit 506 may be coupled to the third terminal IDB of the battery module 504 and may be configured for communicating with the charger 502. For example, the communication unit 506 may be configured for receiving the identity signal from the charger 502 and transmitting commands to the charger 502.

Figure 6:
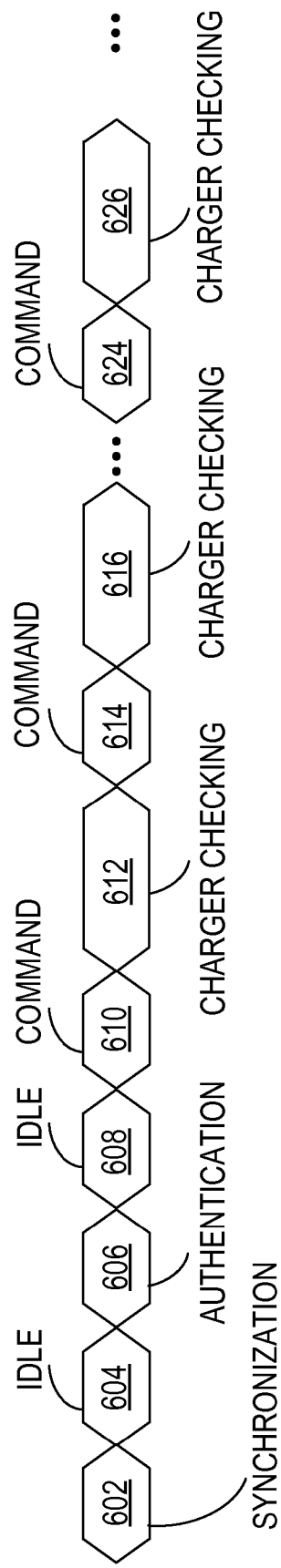
FIG. 6 depicts multiple phases in the communication between a charger and a battery management system (BMS), in accordance with an embodiment of the present teaching.

The charger 502 may communicate with the battery module 504 in multiple phases by the communication unit 508 and the communication unit 506, as shown in FIG. 6. FIG. 5 can be described in combination with FIG. 6. The status of the communication wire 222, e.g., logic high, logic low or high impedance status, may be commonly determined by the communication unit 508 and the communication unit 506.

In a synchronization phase 602, the BMS 288 can pull the communication wire low for multiple clock cycles in order to synchronize the clock of the charger 502 and the clock of the BMS 288 and to request the charger to provide identity information. Then, after an idle phase 604, the BMS 288 may monitor the third terminal IDB to check whether the communication wire 222 is pulled low by the charger 502.

If the charger 502 is connected with the battery module 504, the charger 502 may be configured for outputting the identity signal to the battery module in an authentication phase 606. More specifically, the charger 502 may be configured for pulling the communication wire 222 low for multiple clock cycles in the authentication phase 606 after the synchronization phase 602 and the idle phase 604. More specifically, the communication unit 508 of the charger may receive the identity signal generated by the signal generation unit 240 and determine the number of the multiple clock cycles. For example, if the identity signal indicates that an identity number of the charger 502 is 8, the communication unit 508 pulls the communication wire 222 low for 8 clock cycles. For the battery module 504, if a charger with an identity number 8 is a predetermined appropriate charger for charging the battery module 504, the BMS 288 may monitor the status of the communication wire at the third terminal IDB and identify the charger 502 as an appropriate charger if a logic low status that lasts 8 clock cycles is detected in the authentication phase. If any other status or clock cycles are detected, the BMS 288 may identify or determine the charger 502 as an inappropriate charger, and the alarm unit 210 may generate an alarm signal to warn the user.

If the charger 502 is identified as an appropriate charger, the BMS 288 can transmit commands to the charger 502 in command phases 610, 614, 624 after an idle phase 608. The controller 520 in the charger 502 may be configured for adjusting the output power based on the command. The commands may include adjusting the output current and/or voltage of the charger 502, and stopping the charger 502 from charging the battery module 504. In one embodiment, the BMS 288 can monitor temperature of the battery cells 206 and send commands to the charger 502 such that the charger 502 can adjust an output voltage according to the temperature of the battery cells 206. In another embodiment, the BMS 288 can send commands to the charger 502 such that the charger 502 may charge the battery cells 206 with charging currents having different levels in a predetermined order. The BMS 288 can calculate internal resistance of the battery cells 206 based on the charging currents and cell voltages. Utilizing the internal resistance of the battery cells 206, the BMS 288 can further calculate the state of charge (SOC) and state of health (SOH) of the battery cells. The BMS 288 can perform better cell or module balance strategy based on the SOC and SOH.

After each command phase, there may be a charger checking phase. For example, there are charger checking phases 612, 616 and 626 after the command phases 610, 614 and 624, respectively. In the charger checking phase, the BMS 288 can check whether the charger 502 is still connected with the battery module 504. In one embodiment, if the charger 502 is connected with the battery module 504, the communication wire 222 remains logic high during the charger checking phase.

As shown in FIG. 6, the BMS 288 transmits commands to the charger 502 periodically in the command phases. If the charger 502 fails to receive at least one command during a predetermined time period, the charger 502 may stop charging the battery module.

Figure 7:
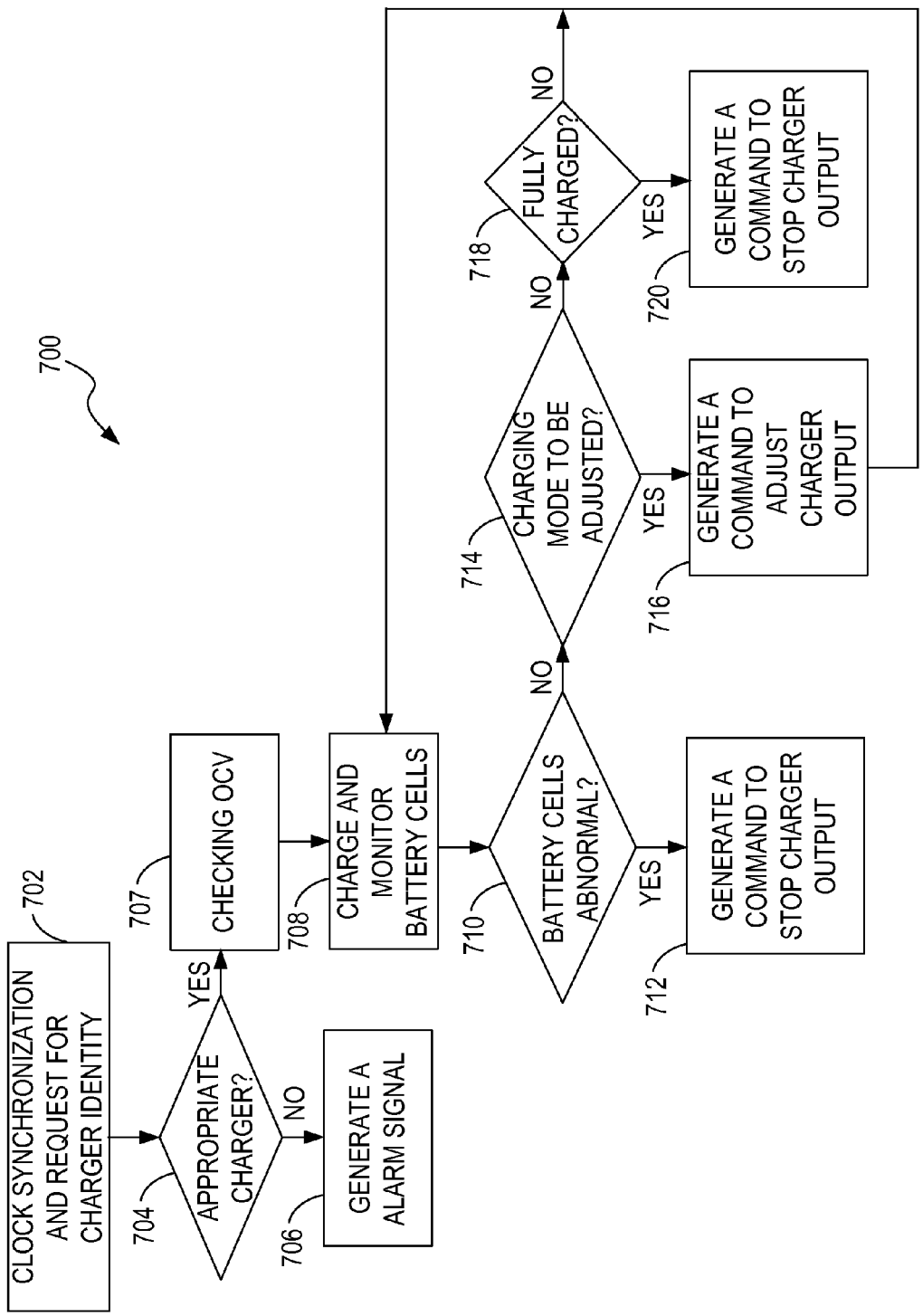
FIG. 7 is a flowchart illustrating a method for operating a BMS in a battery module, in accordance with an embodiment of the present teaching.

FIG. 7 is a flowchart 700 illustrating a method for operating a battery management system (BMS) in a battery module, in accordance with an embodiment of the present teaching.

At 702, the BMS may perform clock synchronization between the BMS and a charger, and request for charger identity. At 704, the BMS can identify whether the charger is an appropriate charger based on the identity information of the charger. If the charger is an inappropriate charger, the flowchart 700 may move to 706. At 706, the BMS can generate an alarm signal. In accordance with some embodiments, at 706, the BMS 288 may stop the battery module 504 from being charged by the charger 502, instead of or in addition to generating the alarm signal. In one example, the BMS 288 may turn off the first terminal BAT+ and the second terminal BAT− at the battery module 504. In another example, the BMS 288 may inform the charger 502 to stop charging the battery module 504, by sending a command signal.

If the charger is an appropriate charger, the flowchart 700 may move to 707. At 707, the BMS can detect an open circuit voltage (OCV) of each battery cell, and determine a charging mode based on the OCV. The OCV may also be utilized by the BMS to calculate the internal resistance of the battery cells, and to further calculate SOC and SOH. At 708, the BMS can monitor battery cells and allow the charger to charge the battery module. At 710, the BMS can check if the battery cells are abnormal. If the battery cells are abnormal, the flowchart may move to 712. At 712, the BMS may generate a command to stop outputting power from the charger such that the charger is prevented from charging the battery module. If the battery cells are normal, the flowchart may move to 714. At 714, the BMS can determine if the charging mode needs to be adjusted. At 716, the BMD can generate a command to adjust the output of the charger if the charging mode needs to be adjusted. If the charging mode does not need to be adjusted, the flowchart 700 may move to 718. At 718, the BMS can check if the battery cells are fully charged. At 720, if the battery cells are fully charged, the BMS may generate a command to stop outputting power from the charger such that the charger is prevented from charging the battery module. If the battery cells are not fully charged, the flowchart 700 may move back to 708, and the BMS may continue monitoring the battery cells.

The embodiments of the present teaching provide a low cost solution to identify and monitor a charger by a battery module. The charger transmits identity information to the battery module. A BMS in the battery module can identify or determine whether the charger is an appropriate charger for charging the battery module based on the identity information of the charger. If a user uses an inappropriate charger to charger the battery module, the user can be warned, and the damage to the battery module or the charger can be therefore avoided.

While the foregoing description and drawings represent embodiments of the present teaching, it will be understood that various additions, modifications and substitutions may be made therein without departing from the spirit and scope of the principles of the present teaching as defined in the accompanying claims. One skilled in the art will appreciate that the teaching may be used with many modifications of form, structure, arrangement, proportions, materials, elements, and components and otherwise, used in the practice of the teaching, which are particularly adapted to specific environments and operative requirements without departing from the principles of the present teaching. The presently disclosed embodiments are therefore to be considered in all respects as illustrative and not restrictive, the scope of the teaching being indicated by the appended claims and their legal equivalents, and not limited to the foregoing description.

We claim:

1. A charger, comprising:
   a first terminal and a second terminal configured for providing an output power to a battery module;
   a signal generation unit configured for generating an identity signal which indicates an identity of the charger; and
   a third terminal configured for outputting the identity signal to the battery module.

2. The charger of claim 1, wherein the identity signal is an analog signal.

3. The charger of claim 2, wherein the identity signal further indicates a temperature of the charger, and the charger is configured for adjusting a voltage of the identity signal in response to the temperature of the charger.

4. The charger of claim 3, wherein the voltage of the identity signal decreases if the temperature of the charger increases.

5. The charger of claim 3, wherein the voltage of the identity signal increases if the temperature of the charger increases.

6. The charger of claim 3, further comprising:
   a controller coupled to the signal generation unit,
   wherein the controller is configured for stopping the charger from charging the battery module if the identity signal indicates that the temperature of the charger is beyond a predetermined range.

7. The charger of claim 1, wherein the signal generation unit comprises:
   a first resistor coupled between the third terminal and ground; and
   a thermistor coupled in series with a switch,
   wherein the thermistor and the switch is coupled in parallel with the first resistor, and wherein a conductance status of the switch is determined based on a voltage across the first resistor.

8. The charger of claim 7, wherein the switch is turned off in response to a test signal generated by the battery module, wherein a voltage of the identity signal is determined based on a resistance of the first resistor, and wherein the voltage of the identity signal indicates whether said charger is an appropriate charger for charging the battery module.

9. The charger of claim 7, wherein the switch is turned on in response to a test signal generated by the battery module, wherein a voltage of the identity signal is determined based on a total resistance of the first resistor and the thermistor, and wherein the voltage of the identity signal varies with a temperature of the charger.

10. The charger of claim 1, wherein the identity signal is a digital signal.

11. The charger of claim 10, wherein the charger is configured for communicating with the battery module in a plurality of phases, wherein the plurality of phases comprises an authentication phase during which the charger is configured for outputting the identity signal to the battery module.

12. The charger of claim 11, wherein the plurality of phases comprises a charger checking phase during which the battery module is configured for checking whether the charger is connected with the battery module.

13. The charger of claim 11, wherein the plurality of phases comprises a command phase during which the battery module is configured for transmitting a command to the charger, and wherein the charger is configured for adjusting the output power based on the command.

14. The charger of claim 13, wherein the charger is configured for stopping charging the battery module if the charger fails to receive at least one command within a predetermined time period.

15. The charger of claim 1, wherein the charger is determined as an appropriate charger for charging the battery module if a voltage of the identity signal is within a predetermined range.

16. The charger of claim 1, wherein the charger is determined as an inappropriate charger for charging the battery module if a voltage of the identity signal is beyond a predetermined range, and an alarm signal is generated at the battery module if the charger is determined as an inappropriate charger.

17. The charger of claim 1, wherein the charger is determined as an inappropriate charger for charging the battery module if a voltage of the identity signal is beyond a predetermined range, and the output power is stopped from being provided to the battery module if the charger is determined as an inappropriate charger.

18. A battery module, comprising:
    a first terminal and a second terminal configured for receiving power from a charger;
    a third terminal configured for receiving an identity signal from the charger; and
    a battery management system configured for determining whether the charger is an appropriate charger for charging the battery module based on the identity signal.

19. The battery module of claim 18, wherein the identity signal is an analog signal, and wherein the charger is determined as an appropriate charger if a voltage at the third terminal is within a predetermined range.

20. The battery module of claim 18, wherein the battery management system is further configured for detecting a temperature of the charger based on the identity signal.

21. The battery module of claim 20, wherein the voltage of the identity signal decreases if the temperature of the charger increases.

22. The battery module of claim 20, wherein the voltage of the identity signal increases if the temperature of the charger increases.

23. The battery module of claim 20, further comprising:
    a test unit coupled to the third terminal and configured for providing a test signal to enable the charger to generate the identity signal, wherein the test signal has a first voltage for determining whether the charger is an appropriate charger or a second voltage for detecting the temperature of the charger, and wherein the second voltage is greater than the first voltage.

24. The battery module of claim 23, wherein the test unit is configured for generating the test signal having the second voltage to detect the temperature of the charger if the battery management system determines the charger as an appropriate charger.

25. The battery module of claim 18, wherein the identity signal is a digital signal, wherein the charger is configured for communicating with the battery module in a plurality of phases, wherein the plurality of phases comprises an authentication phase during which the battery module is configured for receiving the identity signal from the charger.

26. The battery module of claim 25, wherein the plurality of phases comprises a charger checking phase during which the battery module is configured for checking whether the charger is connected with the battery module.

27. The battery module of claim 25, wherein the plurality of phases comprises a command phase during which the battery module is configured for transmitting a command to the charger, and wherein the charger is configured for adjusting an output power based on the command.

28. The battery module of claim 18, further comprising:
an alarm unit configured for generating an alarm signal if the battery management system determines the charger as an inappropriate charger.

29. A computer-implemented method for identifying and monitoring a charger by a battery module, comprising:
receiving power from the charger to the battery module via a first terminal and a second terminal of the battery module;
receiving an identity signal from the charger at a third terminal of the battery module; and
determining whether the charger is an appropriate charger by the battery module based on the identity signal.

30. The method of claim 29, further comprising:
detecting a temperature of the charger based on a voltage at the third terminal of the battery module if the charger is determined as an appropriate charger.

31. The method of claim 30, further comprising:
generating a test signal having a first voltage by the battery module to determine whether the charger is an appropriate charger; and
generating the test signal having a second voltage by the battery module to detect the temperature of the charger, wherein the second voltage is greater than the first voltage.

32. The method of claim 29, further comprising:
generating an alarm signal by the battery module if the charger is determined as an inappropriate charger.

33. The method of claim 29, further comprising:
informing the charger to stop charging the battery module if the charger is determined as an inappropriate charger.

* * * * *